March 24, 1959 R. J. REEK ET AL 2,879,332
CODE CONVERTER
Filed Oct. 25, 1955 8 Sheets-Sheet 1

INVENTORS
ROBERT J. REEK
PHILLIP G. WRAY
BY Emery Robinson
ATTORNEY

March 24, 1959 R. J. REEK ET AL 2,879,332

CODE CONVERTER

Filed Oct. 25, 1955 8 Sheets-Sheet 2

INVENTORS
ROBERT J. REEK
PHILLIP G. WRAY

BY Emery Robinson
ATTORNEY

INVENTORS
ROBERT J. REEK
PHILLIP G. WRAY
BY Emery Robinson
ATTORNEY

INVENTORS
ROBERT J. REEK
PHILLIP G. WRAY
BY Emery Robinson
ATTORNEY

INVENTORS
ROBERT J. REEK
PHILLIP G. WRAY
BY Emery Robinson
ATTORNEY

INVENTORS
ROBERT J. REEK
PHILLIP G. WRAY
BY Emery Robinson
ATTORNEY

INVENTORS
ROBERT J. REEK
PHILLIP G. WRAY
BY Emery Robinson
ATTORNEY

March 24, 1959 R. J. REEK ET AL 2,879,332

CODE CONVERTER

Filed Oct. 25, 1955 8 Sheets-Sheet 8

INVENTORS
ROBERT J. REEK
PHILLIP G. WRAY
BY Emery Robinson
ATTORNEY

United States Patent Office 2,879,332

Patented Mar. 24, 1959

2,879,332

CODE CONVERTER

Robert J. Reek, Bellwood, and Phillip G. Wray, Niles, Ill., assignors to Teletype Corporation, Chicago, Ill., a corporation of Delaware Application October 25, 1955, Serial No. 542,662

18 Claims. (Cl. 178—26)

This invention relates to code converters and more particularly to a transistor controlled converter for translating start-stop signals into signals devoid of start-stop impulses.

When transmitting intelligence from a plurality of message originating devices to a single communication channel each message originating channel is successively alloted transmission time sufficient to transmit one signal. In general these message originating devices produce signals having start and stop impulses interposed with a predetermined number of intelligence impulses. In order to save valuable transmission line time, various equipments have been developed to receive the start-stop signals, store only the intelligence impulses, and subsequently transfer only the intelligence impulses to a multiplex distributor for application to the transmission channel on a time division basis. In order to insure maximum utility of the transmission channel the signals are applied thereto at a rate which is faster than the rate of speed at which all of the signal originating devices are applying signals to the storage facilities.

Heretofore various electromechanical and electronic equipments have been devised to accomplish the storing, transferring and application of signals to the multiplex equipments. Though these equipments have proved quite satisfactory, however, in many instances certain inherent disadvantages are present such as large size, complex design, need for constant servicing and adjusting, frequent and recurring failure of components, and in the case of electromechanical devices the attainable speeds of operation are rather limited.

It is a primary object of this invention to provide a simple, compact code converter utilizing durable transistor controlled components.

Another object of this invention is to provide a converter employing novel gating and control circuits for regulating the initiation of various components into operation to effect the conversion of a start-stop signal into a signal suitable for use in a multiplex transmission system.

A further object of the invention resides in the novel facilities for compensating for the difference in speed at which the intelligence signals are received and the rate at which the intelligence signals are transmitted.

A more finite object of the invention resides in a novel transfer circuit for controlling the application of a signal stored in a first storage circuit to a second storage circuit.

In accordance with the last object, the invention features a transfer circuit that under one condition acts as a bi-stable circuit, but upon certain operating conditions the circuit parameters change and the bi-stable circuit becomes a one-shot multivibrator.

In the following description reference is made to both N and P type power transistors such as shown and described in the patent to Bardeen et al. No. 2,524,035, dated October 3, 1950, and further reference is also made to PNP and NPN type junction transistors such as shown and described in the patent to Shockley No. 2,569,347, dated September 25, 1951. In addition this invention makes use of a line relay of the type shown in the copending application of P. G. Wray No. 511,478, filed May 27, 1955. It is also contemplated to use in the present invention a ring type distributor such as shown in the copending application of R. A. Slusser, Serial No. 349,637, filed April 20, 1953. Moreover, it is contemplated to use the hereinafter described code converter to supply output signals for transmission by a multiplex transmitter distributor of the type shown in the patent to T. A. Hansen, No. 2,609,451, dated September 2, 1952. All these reference devices are hereby incorporated in the present disclosure and wherever possible the teachings of the afore-identified patents and copending applications will not be repeated. It is to be understood, however, that the present invention does not require the use of these particular prior art devices but that other devices may be aptly incorporated with the present invention and satisfactory operation be attained.

With these and other objects in view the present invention contemplates a line relay device for accepting start-stop telegraph signals from an outlying or local tape controlled transmitter. Reception in the line relay of a start impulse actuates circuit elements to release a gating circuit whereupon a clamped oscillator is brought into operation. Output from the oscillator is applied to drive a multi-stage start-stop distributor at a speed which is in synchronism with the speed of reception of the incoming intelligence impulses. As each signal impulse is received it is applied to a selection gate circuit in concordance with the operation of a corresponding stage of the distributor. Each gate circuit controls a bi-stable storage device whereupon an application of a distributor pulse and a signal impulse of a first characteristic causes the bi-stable circuit to operate. However, when said gating circuit has applied thereto a signal impulse of a second character and a distributor impulse, the bi-stable circuit is retained in its initial condition. More particularly, when a so called marking or current impulse is received from the signal generator, the bi-stable circuit is operated whereas when a spacing or no current signal is received from the signal generator the bi-stable storage circuit is retained in its initial condition.

Facilities are provided to immediately or belatedly transfer the stored signal to a second level storage circuit wherein said stored signals are employed to control the signal generated by one channel of a multiplex distributor of the type shown in the afore-identified Hansen patent. Following transmission by each channel of a stored signal by the multiplex distributor, an operating pulse is generated which is applied to clear the signal stored in the second level storage circuits. This operating pulse is also utilized to effect the transfer of a signal stored in the first level storage device. Signals are removed from the first level storage circuits by a transfer component which is actuated once during each cycle of operation of the start-stop distributor.

The rate of transmission of signals by the transmitting distributor is such that all message originating channels supplying signals do not supply the signals at a rate which is as fast as the rate that the multiplex distributor is imparting the signals to the outgoing signaling channel. It may be thus appreciated that the operating pulses supplied by the multiplex distributor are being fed into the code converter to effectuate transfers at a rate which is faster than the signals are being received and cleared out of the first level storage circuit. If these rates of signal clearing and transmission were maintained there would be times when the transmitting distributor would gain on the incoming signals to such an extent that two operating pulses would be applied into the first level storage device before the signal is cleared therefrom. The result would be that the same signal might be transmitted twice. In order to compensate for this variation in rates of clearing signals and transmitting signal impulses, facilities are provided to impart a blank signal every so often. This is accomplished by precluding the transfer of the signal stored in the first storage circuits by an operating pulse from the multiplex distributor and clearing the second level storage circuits so that when the multiplex distributor transmits a signal in accordance with the condition of said second storage level, a blank signal will be generated.

More particularly, this desirable result is attained by controlling the generation of a transfer pulse by means of a gating circuit which is under the conjoint control of a bi-stable circuit actuated by the start stage in the multistage start-stop distributor and the operating pulse coming from the multiplex transmitting distributor. When the conjoint control is absent, as would be the situation where a second operating pulse is received before a second operation of the start stage, the bi-stable circuit is not operated to produce a pulse to effectuate the transfer of the signal stored in the first level storage circuits.

In addition, the transfer circuit features novel arrangements in that the duration of the transfer pulse may be varied under the control of the stop stage of the multistage start-stop distributor when functioning in concomitancy with the receipt of the operating pulse from the transmitting distributor. In the most common operation of the transfer circuit, the transfer circuit will operate during the receipt and storage of a signal from the start-stop signal generator thereby transferring the signal impulses already stored in the bi-stable first level storage circuits and thereafter as each signal impulse is received it is immediately transferred to the second level storage circuit. Upon the next start-stop signal being received, the start stage of the start-stop distributor operates to clear the signal which has now been transferred to the second level storage circuits. Thus, the first level storage circuits are prepared to receive the forthcoming intelligence signal impulses included in this signal.

Other objects and advantages of the present invention will be apparent from the following detailed description when considered in conjunction with the accompanying drawings wherein.

Figure 6:
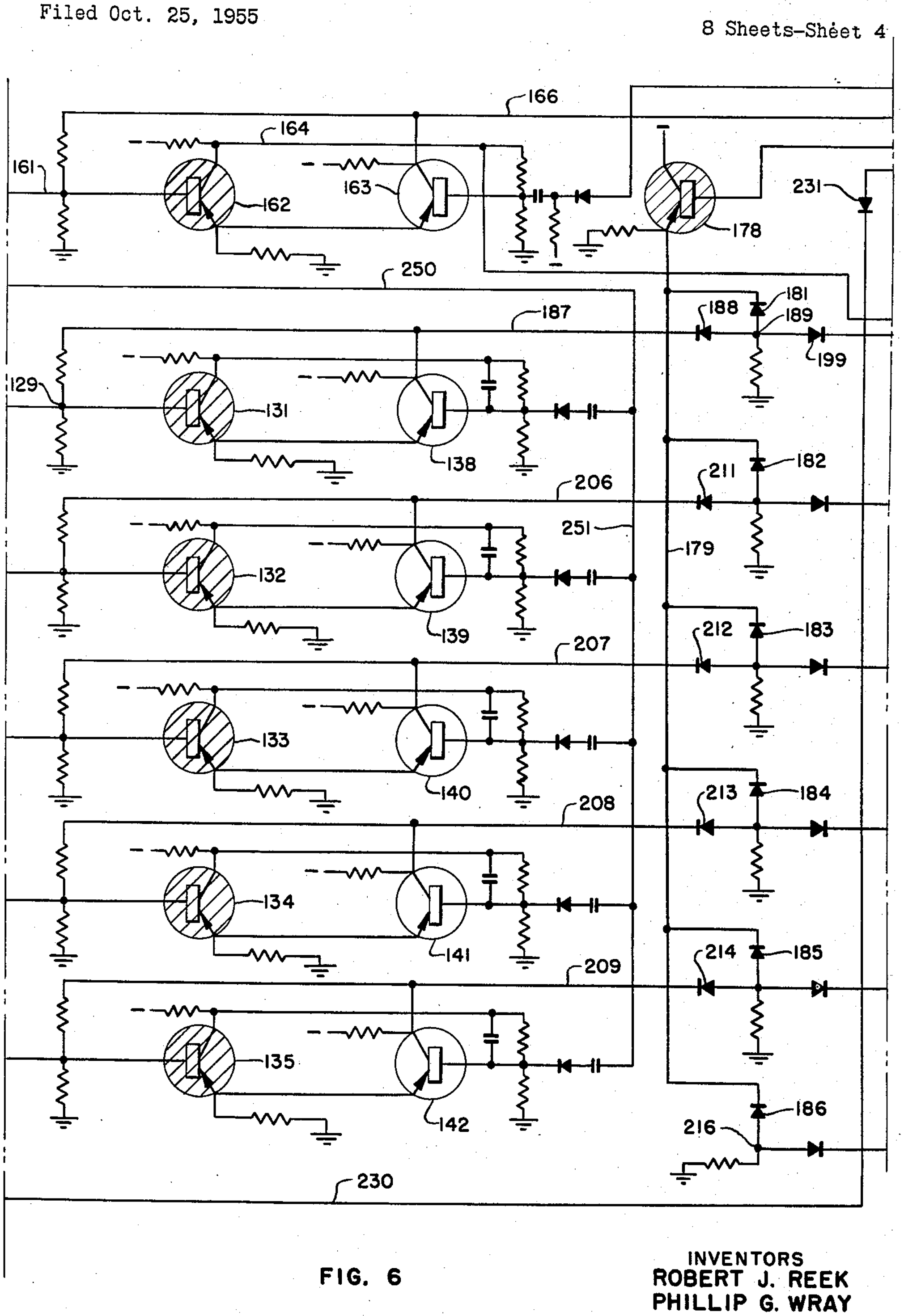
Figure 7:
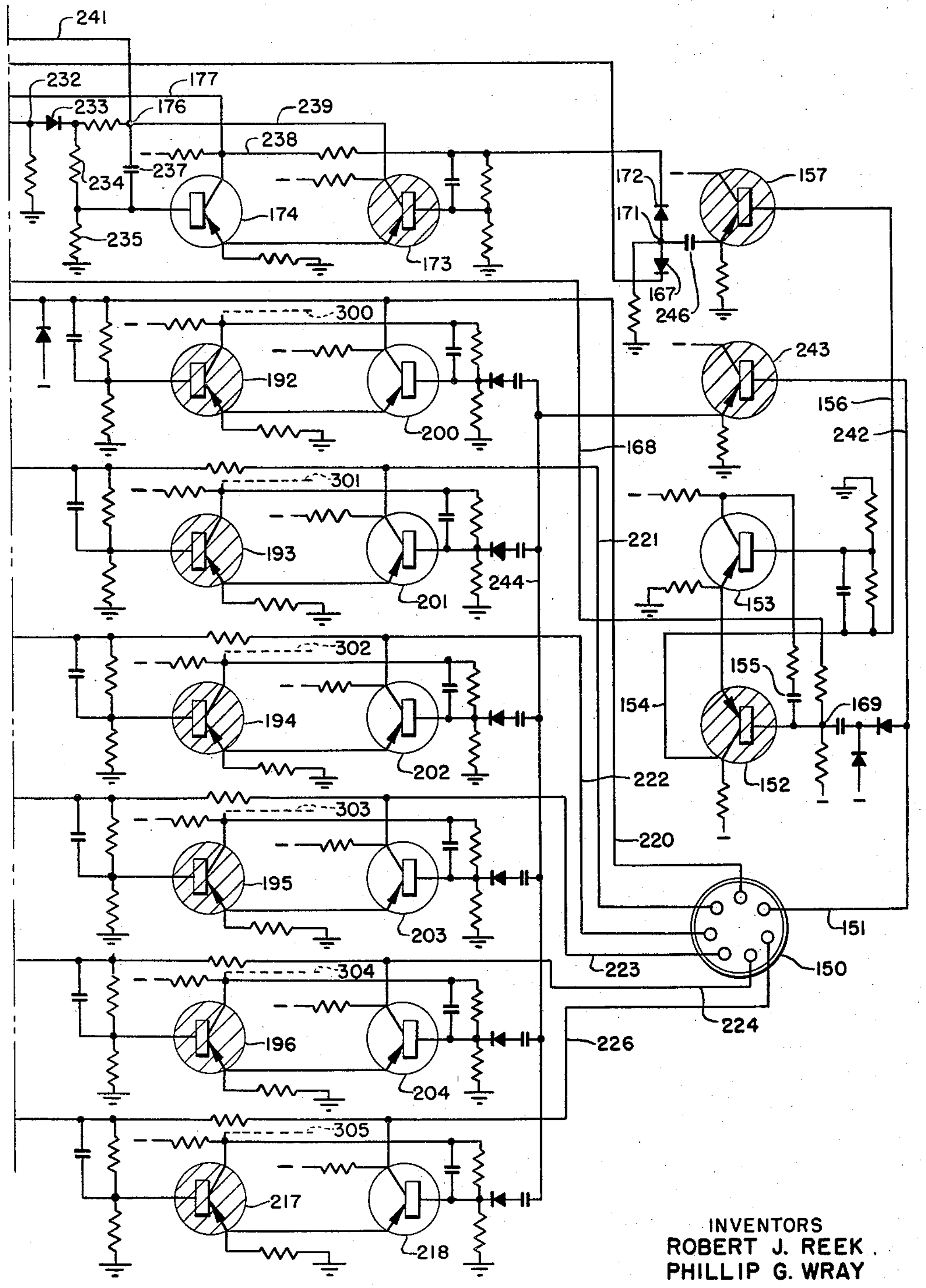
Figure 8:
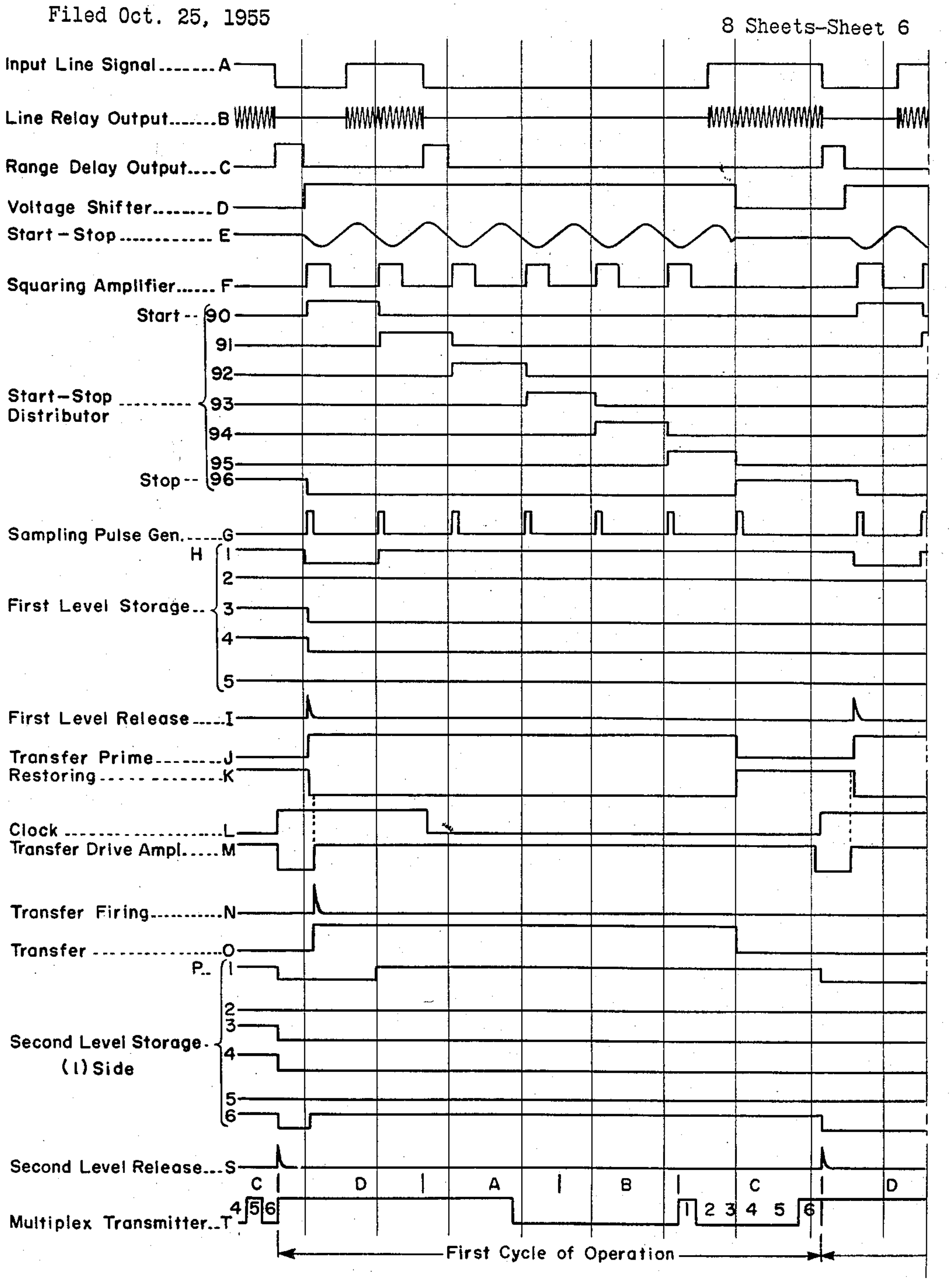
Figure 9:
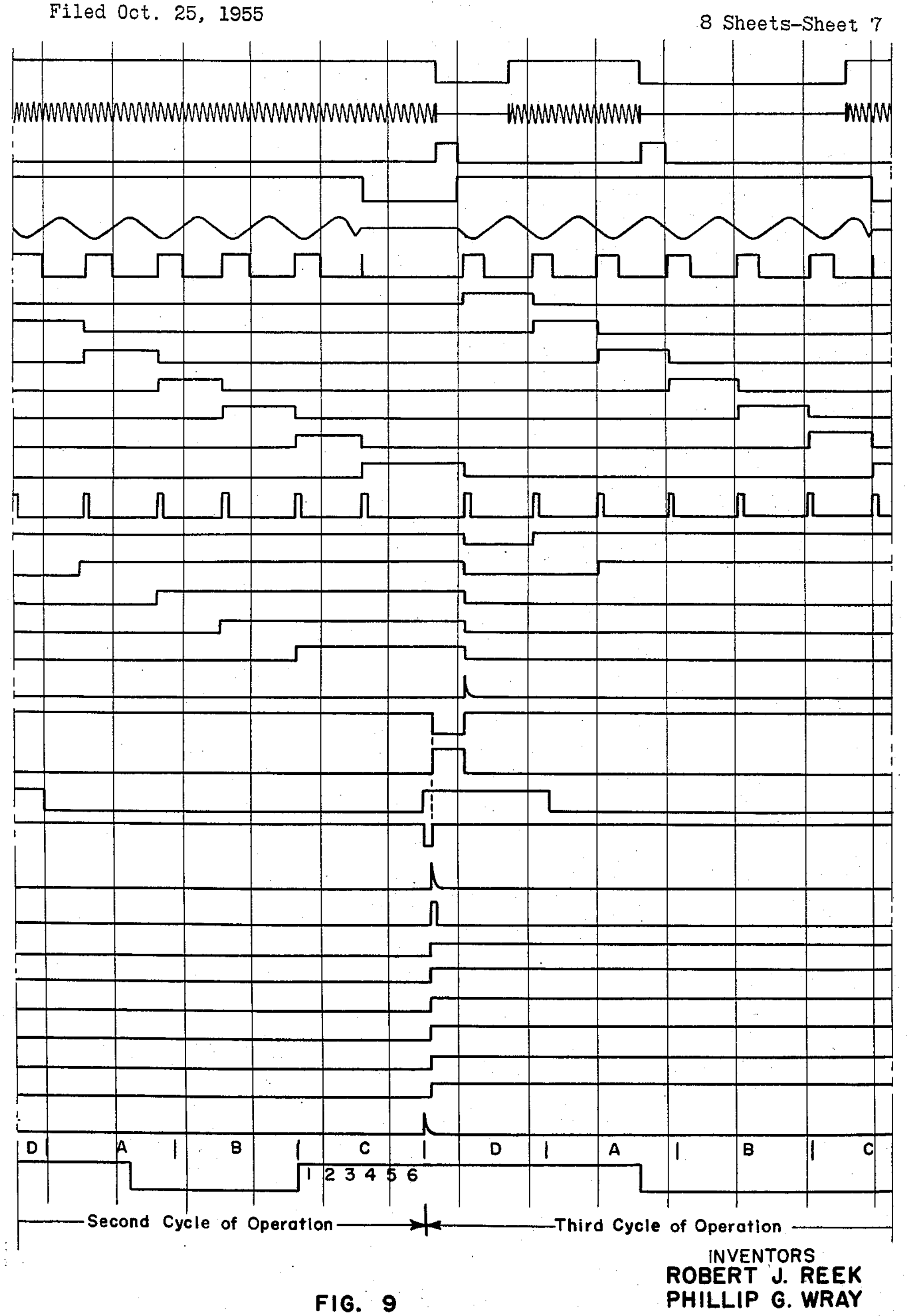
Figure 10:
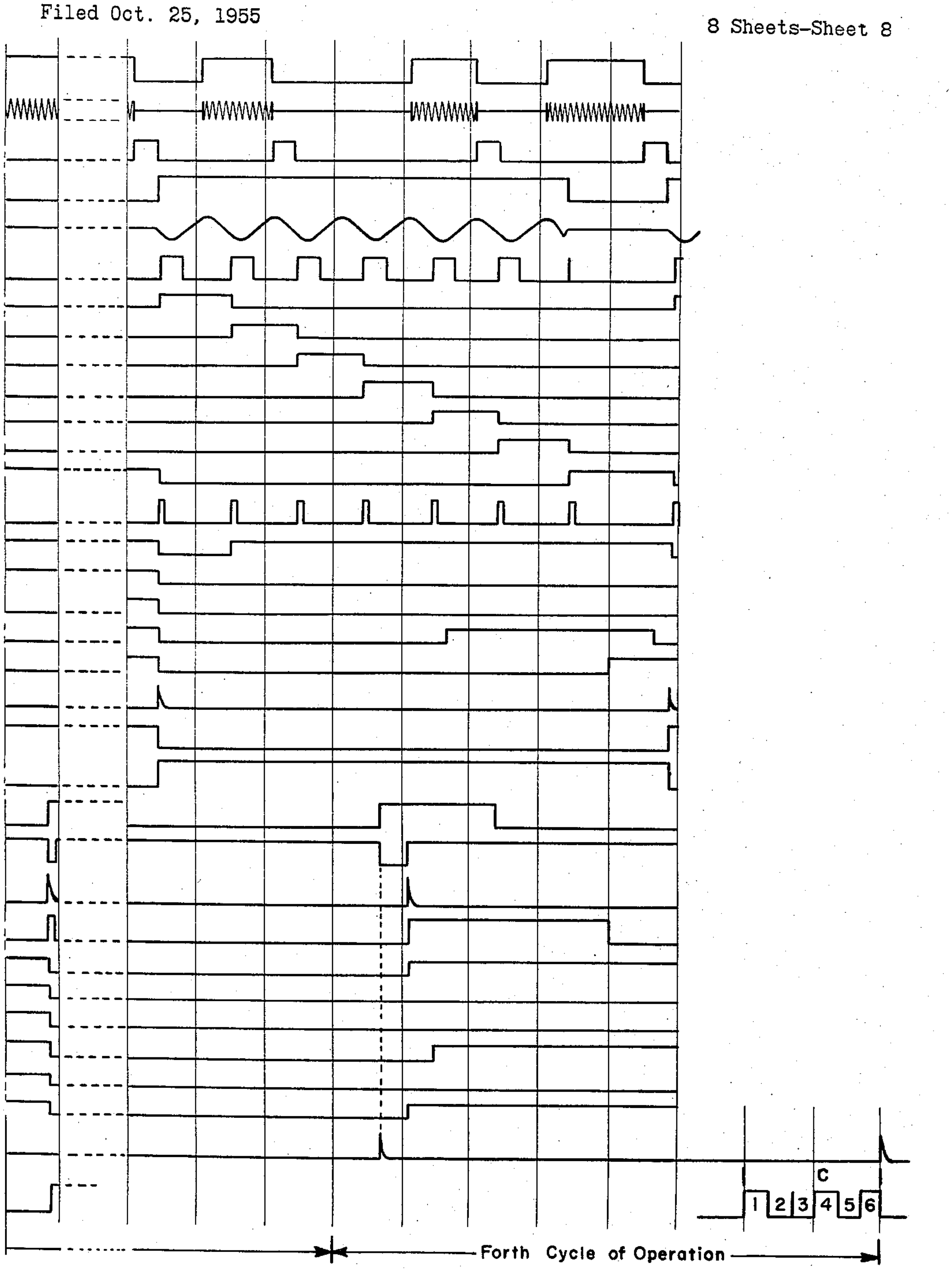

Figs. 4, 5, 6 and 7, when assembled, show the principal circuit components of a code converter embodying the features of the invention; and Figs. 8, 9 and 10, when assembled, illustrate a timing diagram showing the relative times that the various components function with respect to each other and with respect to the reception and transmission of signals.

Figure 1:
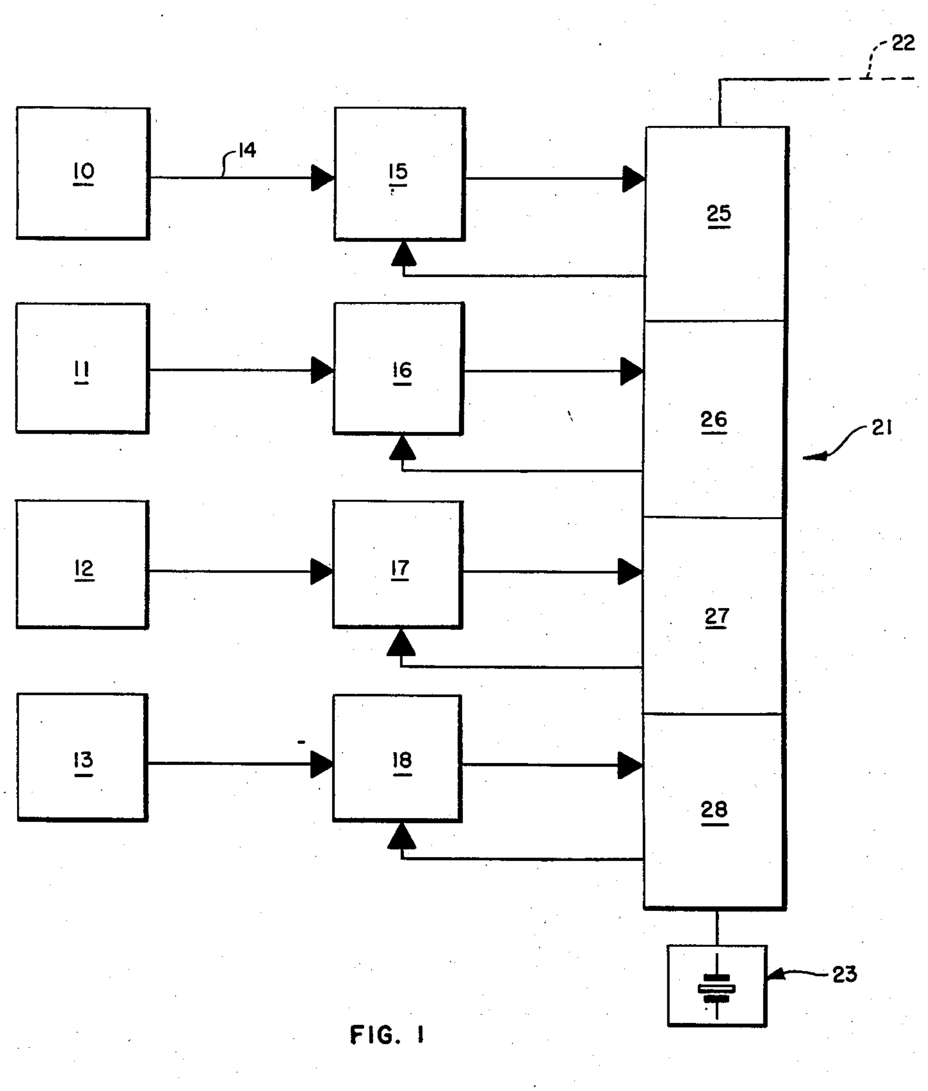
Fig. 1 is a block diagram showing an electronic multiplex transmitting distributor, a number of code converters embodying the principal features of this invention and a plurality of signal generators for controlling the application of signals to the code converters.

Referring to Fig. 1 there is shown a plurality of signal generators designated by reference numerals 10, 11, 12 and 13 which may be tape or otherwise controlled, but which are adapted to generate start-stop Baudot code signals at a relatively fixed rate of speed. The outputs of the signal generators are applied over suitable leads to a bank of code converters 15, 16, 17 and 18 wherein the start and stop impulses associated with each generated signal are removed. Storage facilities are provided within the code converters for the intelligence portion of the signals. These storage facilities control the signals generated by a multiplex transmitting distributor generally designated by the reference numeral 21, which successively applies the signals stored in each succeeding code converter to a single outgoing transmission line 22 or to a radio transmitter. As previously indicated this transmitting distributor may be of the type shown in the afore-identified patent to Hansen and as described therein the transmitting distributor is driven by a crystal oscillator which in the present disclosure is merely represented by a block diagram identified by the reference number 23. The four sections or channels of the multiplex distributor are designated by the reference numerals 25, 26, 27 and 28. Following transmission of a signal associated with each channel of the multiplex distributor, an operating pulse is generated within the multiplex distributor and is applied back to the associated code converter to (1) remove the signal stored therein and (2) transfer a new signal to the storage facilities in anticipation of the next subsequent transmission from this channel.

Figure 2:
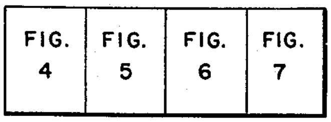
Fig. 2 is an instruction diagram illustrating the proper manner of assembling Figs. 4, 5, 6 and 7.
Figure 3:
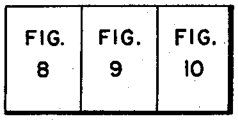
Fig. 3 is an instruction diagram showing the manner of assembling Figs. 8, 9 and 10.
Figure 4:
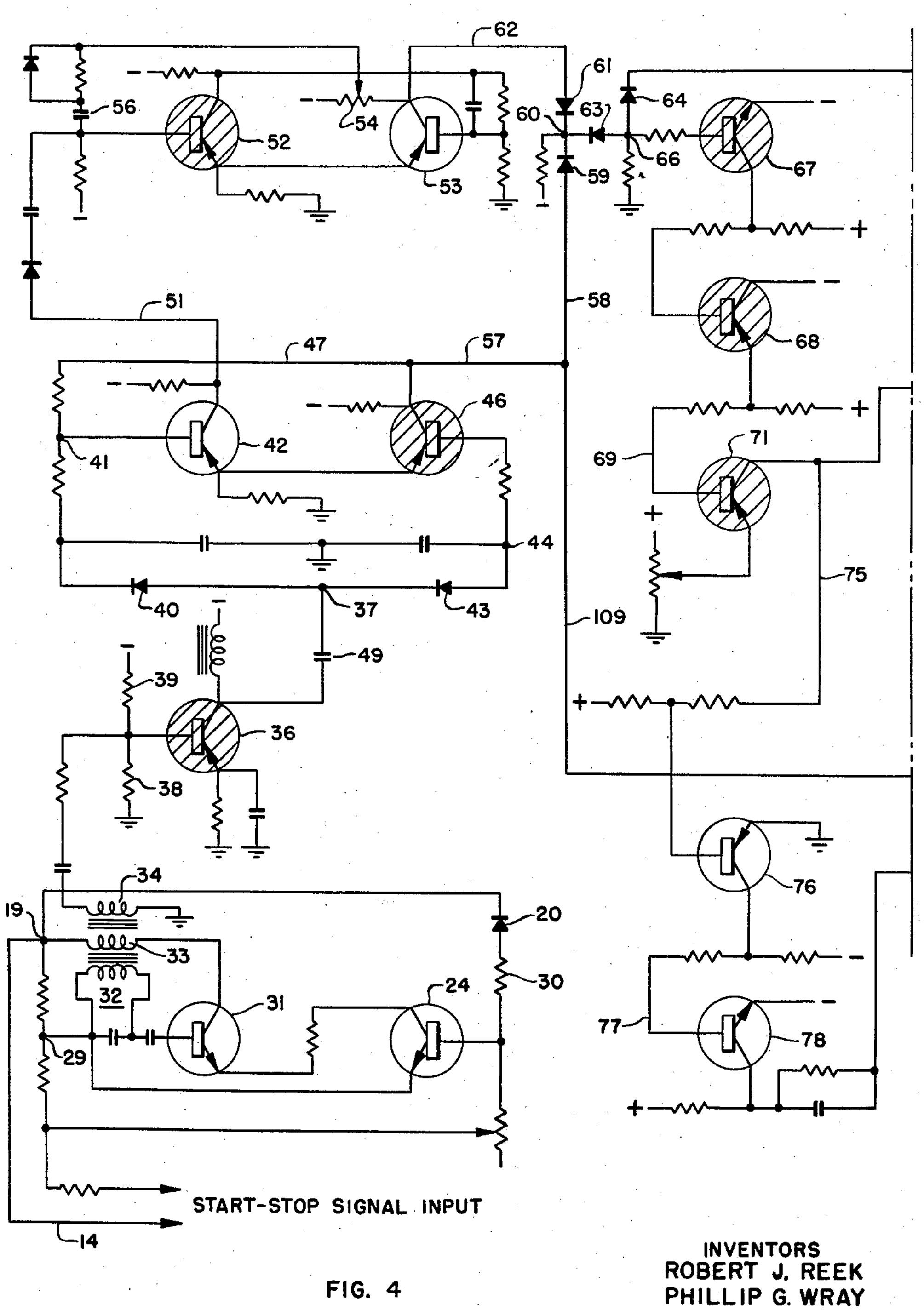
Figure 5:
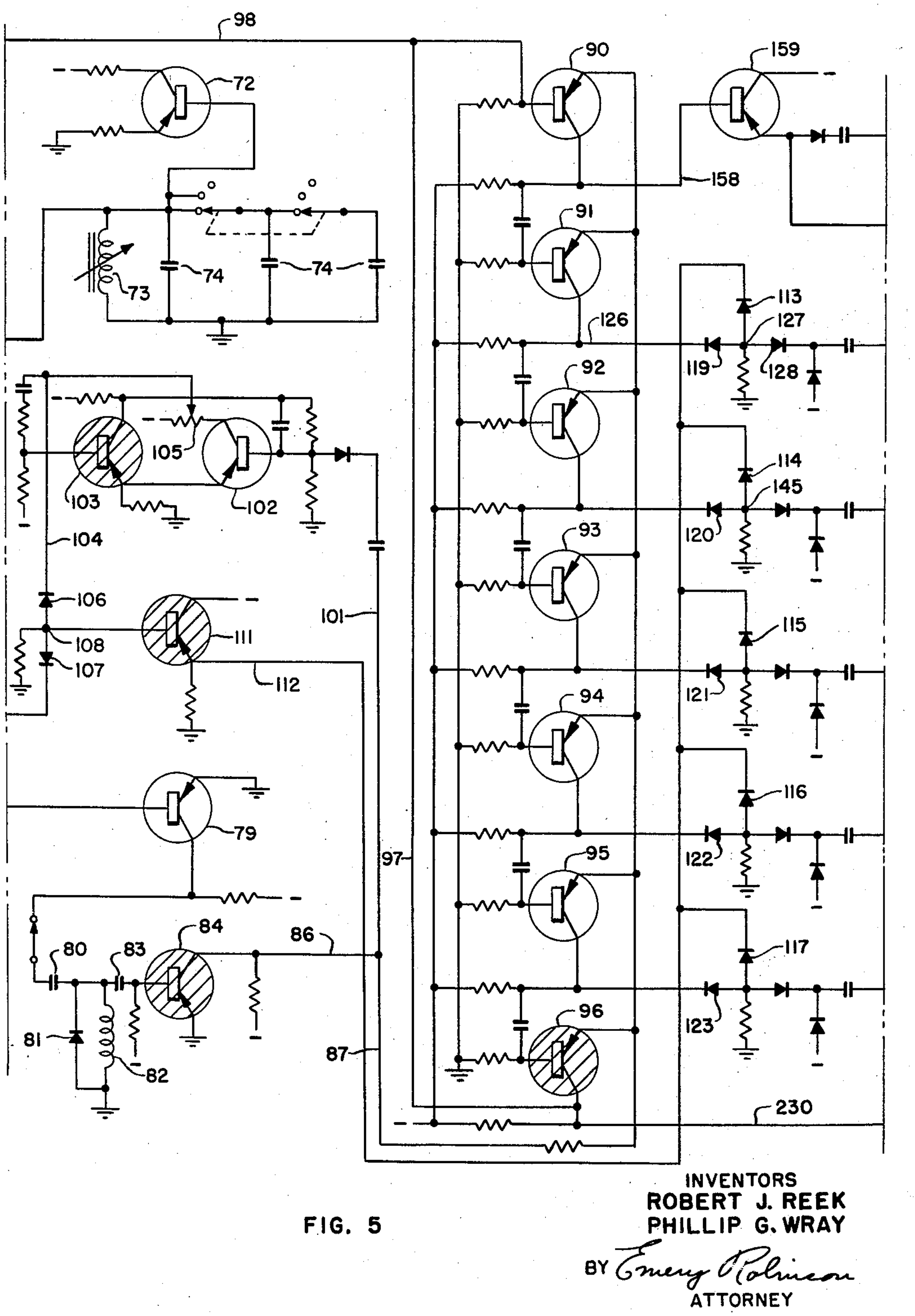

One of the code converters generally designated by the reference numerals 15, 16, 17, and 18, is shown in detail in Figs. 4, 5, 6 and 7 when assembled in the manner indicated by Fig. 2. When considering the operation of the code converter, frequent reference should be made to the timing diagram illustrated in Figs. 8, 9 and 10 which depicts the operating conditions of the various components during the reception, conversion and transmission of several typical signals. In the drawings there are shown transistors having circles therearound which are shaded and circles which are not. The shaded circles are illustrative of transistors which are normally conducting and the unshaded circles represent transistors which are normally nonconducting.

A train of signals generated by one of the signal generators 10, 11, 12 and 13 is illustrated in Figs. 8, 9 and 10 and is therein designated by the reference letter A. The incoming signal is applied over a lead 14 which normally has a marking or current condition therein. Under normal conditions with a marking condition impressed on line 14 the potential at a junction point 19 is maintained relatively high. This increased potential is also applied to the high resistance side of a Zener diode 20 which causes said diode to assume a conductive state when the potential rises to a value beyond the Zener point of the diode. With Zener diode 20 conducting, an increased potential is applied to the base of an NPN type junction transistor 24 thus causing this transistor to assume a conductive state because its emitter is connected to a junction point 29 which is at a lower potential than that existing on the base. The base potential is determined by the value of potential at junction point 19 less the IR drop through the now low impedance Zener diode 20 and a small resistance 30.

The relatively high potential on the junction point 19 is also impressed on the collector of the transistor 31. Transistor 31 has a resonant circuit 32 connected to its base. The resonant circuit is also connected to the junction point 29 which as previously mentioned is at a relatively low potential. The collector circuit of transistor 31 is inductively coupled by a center winding of a triple wound transformer 33 to the inductance of the resonant circuit 32. With the high potential of junction point 19 being maintained by a marking condition on the line 14, the transistor 31 will operate in an oscillatory fashion and the frequency of oscillation will be sustained by the feed back back circuit running from the collector of the transistor 31 to the inductance connected to its base. A third winding 34 of the triple wound transformer 33 has induced therein tone potentials which are indicative of a marking condition on the line 14. The details of the construction and operation of this circuit are set forth in the afore-identified copending application to Wray.

Line A in Figs. 8, 9 and 10 indicates the potential of a series of incoming signal impulses. It will be noted that the first or start impulse preceding a signal is invariably of a spacing or no current character hence the application of this signal over lead 14 causes the potential on junction point 19 to drop. With the removal of potential on junction point 19, the Zener diode 20 ceases to conduct and the transistors 24 and 31 assume a nonconductive condition, thereupon precluding the further generation of the oscillatory tone output in the winding 34. The winding 34 is connected to the base of a normally conducting transistor amplifier 36. The tone output of the line relay is denoted in Figs. 8, 9 and 10 by the wave form B.

When there is tone output from the oscillator circuit being induced in the winding 34, the amplifier 36 will produce amplified potential variations at a junction point 37. The level of conduction at which the amplifier 36 normally operates is fixed by a voltage divider consisting of resistances 38 and 39, the latter of which is connected to a source of negative potential. Thus, when tone output is impressed on the amplifier 36, the variations of potential will also be applied at junction point 37. As the potential of junction point 37 goes in a positive direction, the increased potential will be impressed through a diode 40, through a junction point 41 connected to the base of a transistor 42 to hold this transistor shut off. In a like manner when the potential at junction point 37 goes in a negative direction, the negative potential will be reflected through a diode 43 to a junction point 44 which is connected to the base of a transistor 46. Appearance of a negative potential on the transistor 46 drives this transistor into a state of conduction. The base of transistor 42 is also connected through a coupling lead 47 to the negative collector potential on the transistor 46, but the appearance of positive potential at junction point 41 due to the positive going pulse of the tone signal overcomes the negative potential applied over lead 47 to hold the transistor 42 from conduction.

As previously indicated when a start signal is impressed on lead 14, the oscillator circuit ceases to produce a tone output and inasmuch as the amplifier 36 is connected by a coupling condenser 49 to the junction point 37 the potential at the junction point will no longer fluctuate to provide the operating potentials through the diodes 40 and 43. Immediately thereafter the junction point 44 goes positive with respect to its previous condition and thereupon raises the base potential on the transistor 46 to shut this transistor off. The collector potential of transistor 46 immediately drops to impress decreased negative potential over the lead 47, through the junction point 41 to the base of transistor 42. Inasmuch as the positive potential due to the tone signal is no longer present at junction point 41, the base of transistor 42 is immediately driven negative with respect to its emitter to place this transistor in a conductive state.

Conduction of transistor 42 is followed by a rise in its collector potential which is impressed over a lead 51 to the base of a normally conducting transistor 52. Transistor 52 together with a transistor 53 and the associated circuits form a one-shot multivibrator, consequently when the base of transistor 52 assumes an increased potential value, transistor 52 is shut off causing its collector potential to drop which drop is impressed on the base of the transistor 53 to drive this transistor into a state of conduction. The collector of transistor 53 is connected through an adjustable resistance 54 to a capacitance 56 which in turn is coupled to the base of the transistor 52. The adjustable resistor 54 may be varied to change the time constant of the RC circuit associated with the base of the transistor 52, and hence vary the time that the one shot multivibrator restores to its initial condition as shown. The collector potential of transistor 53 is denoted in Figs. 8, 9 and 10 by the reference line C.

When transistor 46 is shut off, its collector potential drops and this drop is also impressed over leads 57 and 58 to one diode 59 forming, together with a second diode 61, a so-called "and" gate. More particularly, to permit a junction point 60 between the diodes 59 and 61 to assume a low value, it is necessary that a low potential be applied to both diodes. When transistor 53 assumed a conductive condition, its collector potential rises and this rise in potential is impressed over a lead 62 to the diode 61 consequently holding the junction point 60 between the diodes at a relatively high value. Upon the one-shot multivibrator executing a cycle of operation and restoring to its initial condition, the collector potential on transistor 53 again drops and this drop is impressed over the lead 62 to the diode 61. It will be appreciated that now both diodes have a relatively low potential thereon and as a result the junction point 60 will assume the low value. It may be thus understood that if a start signal of relatively short duration had been received over the line 14, or interference from a hit on the line interrupts the marking condition on line 14, then the transistors 42 and 46 would be restored to the condition, shown in the drawing, before the one shot multivibrator consisting of transistors 52 and 53 could execute a cycle of operation. With a shutting off of the transistor 46 due to a short start pulse or a hit on the line 14, the transistor 46 will only assume a nonconducting condition for a relatively short time whereupon it will restore to its normal conducting condition to apply an increased collector potential over the leads 57 and 58 to the diode 59 thereby precluding the junction point 60 from dropping to a low value when the one shot multivibrator has restored to its initial position to apply a decreased potential on the diode 61. It may therefore be comprehended that this circuit precludes to tripping of the code converter upon receipt of a spurious start impulse.

The one-shot multivibrator consisting of transistors 52 and 53 also serves the function of a range adjusting circuit; that is, this multivibrator will control the time at which a series of constant frequency sampling impulses will commence to be generated. These sampling impulses will be used to sample the incoming intelligence signal impulses at the center of each impulse so that an accurate determination may be made of the true character of each impulse.

Returning now to a consideration of the events occurring subsequent to a drop in the potential of the junction point 60 due to the receipt of a proper start impulse; the drop in potential of junction point 60 is applied to a diode 63 which together with a diode 64 forms an "or" gate, that is, upon a decrease in potential applied to either of the diodes 63 or 64 a corresponding drop in potential will be noted at a junction point 66. The drop in potential on junction point 66 is impressed on the base of a normally conducting NPN type junction transistor 67 to cause said transistor to assume a nonconducting condition. The condition of the collector potential of voltage shifter transistor 67 is depicted in Figs. 8, 9 and 10 by the line D. Nonconduction of the transistor 67 is accompanied by a rise in its collector potential which is impressed on the base of a normally conducting emitter follower PNP type junction transistor 68, thereby driving this transistor towards a state of nonconduction. As transistor 68 assumes a nonconductive state, its emitter potential will rise causing an increased potential to be impressed over a lead 69 to the base of a normally conducting PNP type junction transistor 71. Transistor 71 in its conductive state holds from operation, an oscillator consisting of a point contact N type transistor 72 and a resonant circuit connected in its base circuit. The resonant circuit consists of an inductance 73 and a group of capacitances 74 which may be selectively connected in and out of the resonant circuit to set the frequency output of the oscillator in accordance with the frequency of the incoming intelligence signal impulses. With the transistor 71 conducting, a shunt circuit is completed for the resonant circuit and a small positive bias is applied to the upper plates of the capacitances 74. When the transistor 71 is rendered nonconducting, the shunt circuit for the resonant circuit is no longer complete and as a result thereof the small positive potential on the capacitances will be dissipated through the inductance 73 to drive the base of the transistor 72 in a negative direction thereby initiating the oscillator into operation by causing the first oscillation to be in a negative direction and to be of proper magnitude.

The output of the oscillator circuit is impressed over a lead 75 and is in the nature of a sinusoidal varying potential wave such as illustrated in Figs. 8, 9 and 10 by the wave form represented by the letter E. When the potential on lead 75 drops to a sufficient value, a transistor 76 is driven into a state of conduction and thereafter its collector potential rises to impress an increased potential over a lead 77 to the base of an NPN type junction transistor 78. Conduction of transistor 78 is followed by a drop in its collector potential which is impressed on the base of another transistor 79 to cause this transistor to assume a conductive state. Transistors 76, 78 and 79 function to change the sinusoidal output of the oscillator into pulsations having a square wave form. (See wave form F.)

Conduction of transistor 79 is followed by a sharp rise in its collector potential which is impressed through a capacitance 80 in a ringing circuit consisting of a diode 81 and an inductance 82. The diode 81 acts to shunt out A.C. components of the pulse applied to the ringing circuit and as a result thereof a positive pulse is impressed through a coupling capacitance 83 to the base of a normally conducting transistor 84. The appearance of a positive going pulse on a transistor 84 causes this transistor to become nonconductive whereupon its collector potential immediately drops. The drop in collector potential is impressed over leads 86 and 87 to the emitters of a number of transistors designated by the reference numerals 90, 91, 92, 93, 94, 95 and 96. These transistors are interconnected together in a closed ring in the manner indicated in the afore-identified copending application of R. A. Slusser.

As described in the Slusser application a number of transistors connected together in the manner illustrated form a closed ring type distributor. The distributor normally has one transistor in a conductive stage and all of the other transistors are nonconducting. The application of a negative pulse onto a lead which is common to all the emitters of the transistor causes the conducting transistor to assume a nonconducting state whereupon its collector potential immediately drops to impress a negative going pulse to the base of the next succeeding transistor connected in the ring thereby rendering this next succeeding transistor conducting. Upon each succeeding application of a negative going pulse to the common emitter circuits of all the transistors, the conducting transistor is rendered nonconducting and the next succeeding transistor is rendered conducting. The output potentials on the collectors of the transistors in the ring are illustrated in Figs. 8, 9 and 10 by the lines respectively designated 90, 91, 92, 93, 94 and 95.

It will thus be appreciated that a negative going pulse on the lead 87 renders the normally conducting transistor 96 nonconducting. Nonconduction of transistor 96 is followed by a drop in its collector potential which is impressed over a lead 97 to the base of the transistor 90, placing this transistor in a conducting state. The drop in collector potential of transistor 96 is not only applied to the base of the transistor 90 but is also applied over a lead 98 to the diode 64 which as previously mentioned forms with the diode 63 an "or" gate. The appearance of decreased potential on diode 64 now holds the junction point 66 at the low value, and thus the transistor 67 will be held in the off condition (see line D in Figs. 8, 9 and 10) independent of the potential applied to the diode 63. With the transistor 67 shut off, the oscillator will continue to produce a sinusoidal output which as previously described is utilized to provide a periodic negative going pulse to the common emitter circuit associated with the transistors 90 to 96, inclusive. Transistors 90 to 96 will thereupon be successively rendered nonconducting and conducting until such time as the transistor 96 again assumes a conductive condition, whereupon its collector potential will rise to impress an increased potential over the leads 97 and 98 to the diode 64 thereby causing the potential of junction point 66 to rise because the potential at diode 63 is also at the elevated value due to the receipt of a stop impulse over line 14. Increase in potential on the junction point 66 is followed by the almost instantaneous conduction of transistors 68, 67, and 71. Conduction of transistor 71 again completes the shunt circuit for the resonant circuit associated with the transistor 72 to preclude the further generation of the oscillator output. The frequency of operation of the stages of the distributor is equal to the frequency of the oscillator and thus also equal to the frequency of the incoming intelligence signal impulses.

Turning now to a consideration of the drop in potential on lead 86 which occurs when the transistor 84 is shut off, this drop is also impressed on a lead 101 to the base of a normally nonconducting PNP type junction transistor 102, thereby rendering this transistor conductive. Transistor 102 together with a normally conducting transistor 103 and interconnecting circuits form another one shot multivibrator which has a relatively short period of operation. The output of this one shot multivibrator is illustrated in Figs. 8, 9 and 10 by the line G and is utilized to produce pulses which are employed to sample the condition of the incoming signal impulses at approximately their midpoints. More particularly, when the transistor 102 assumes a conductive condition its collector potential immediately rises to impress an increased potential or selection pulse, through an adjustable resistance 105, over a lead 104 to a diode 106. Diode 106 together with a diode 107 from another "and" gate; that is, a junction point 108 will only assume an increased potential value as the potentials applied to diodes 106 and 107 are simultaneously raised. Adjustable resistance 105 is provided for the purpose of varying the width of each generated selection pulse.

Returning now to a consideration of transistor 46 (see Fig. 4), it may be appreciated that whenever a tone signal which is indicative of a marking condition is applied to amplifier 36 the transistor 46 will assume a conductive condition. Whenever there are no tone signals applied to the amplifier 36 which is indicative of a spacing condition then the transistor 46 will assume a nonconducting condition. For purposes of illustration, assume that the first intelligence signal is a marking condition such as indicated in line A in Fig. 8, then the transistor 46 will assume a conductive condition and its collector potential will increase thereby applying an increased potential over the lead 57 and over a lead 109 to the diode 107. Now when the one shot multivibrator consisting of transistors 102 and 103 executes a cycle of operation, the potential on lead 104 will also rise therefore causing the potential applied to diode 106 to rise. It will be recalled that the one shot multivibrator is delayed in its operation due to the time requirement for the one shot multivibrator consisting of transistors 52 and 53 to restore to its initial condition which thereupon causes the oscillator to commence functioning. As a result of the increased potential appearing on both diodes 106 and 107, the junction point 108 will rise in potential for a short period of time as determined by the time of conduction of the transistor 102, and as this occurs at the midpoint of the received signal a true representative sampling is taken of this marking impulse. The rise in potential on junction point 108 is impressed on the base of a normally conducting emitter follower type transistor 111, therefore, driving said transistor into a low state of conduction. Upon a decrease in conductivity of transistor 111, its emitter potential is increased to impart an increased potential over a lead 112 to a number of diodes 113, 114, 115, 116 and 117, forming together with an equal number of diodes 119, 120, 121, 122 and 123, selection "and" gates.

It will be recalled that when the start impulse was received, the transistor 96 in the distributor was shut off and the transistor 90 was rendered conducting. Thereafter, at the time that the first intelligence impulse is received, the transistor 91 is rendered conducting causing its collector potential to rise. The rise in collector potential of transistor 91 is impressed over a lead 126 to the diode 119. It will be remembered that an increased potential is presented on the diode 113 due to the sampling pulse ascertaining the presence of marking impulse; thus a junction point 127 connected between said diodes will also rise in potential. An increase in potential on junction point 127 is accompanied by the impression of an increased potential through a diode 128, and a junction point 129 to the base of a normally conducting transistor 131, to render this transistor nonconducting. Transistor 131 and a number of transistors 132, 133, 134, and 135, together with associated transistors 138, 139, 140, 141, and 142 and interconnecting circuits form bistable storage circuits for the incoming signal impulses. The rendering of transistor 131 nonconducting which is indicative of a received marking impulse, is accompanied by a drop in its collector potential which is impressed on the base of the transistor 138, therefore driving this transistor into a high state of conduction. Inasmuch as the collector of the transistor 131 is coupled to the base of the transistor 138 then the base of transistor is driven negative with respect to its emitter to render transistor 138 conductive. The bi-stable circuit will thereafter maintain a condition wherein the right-hand transistor is conducting and the left-hand transistor is cut off.

Looking at Fig. 8 it may be seen that the next incoming signal impulse shown in line A is a spacing condition. The receipt of a spacing condition over line 14 causes the tone generator to cease operation and as a result the transistor 46 is shut off causing its collector potential to drop. This drop in collector potential is impressed over leads 57 and 109 to the diode 107, therefore, when the one shot multivibrator 102—103 is operated, the rise in potential applied to the diode 106 is ineffective to raise the potential of the junction point 108. Inasmuch as the junction point is unaltered in potential value, the transistor 111 will maintain a conductive condition to keep the potential applied over lead 112 and hence applied to diode 114 at a relatively low value. When the transistor 92 in the start-stop distributor operates, it causes its collector potential to rise and thus apply an increased potential to the diode 120. This increase in potential applied to diode 120 is ineffective to raise the potential of a junction point 145 connected between the diodes 114 and 120 because the potential applied to diode 114 is now at the low value. Moreover, with no change in potential of junction point 145, the transistor 132 and 139 will maintain the condition shown in the drawing which condition is indicative of a stored spacing signal. In a like manner the other diode gates 115—121, 116—122, and 117—123, will function to control the respective bi-stable circuits 133—140, 134—141, and 135—142. If the incoming signal impulses are in accordance with the condition shown in line A of Fig. 8 then the last three bi-stable circuits will maintain the nonoperated condition as shown.

Turning now to a consideration of an event that occurs prior to or during the operation of the start-stop distributor and the storage of the signal in the bi-stable circuit, it will be noted that in the right-hand portion of Fig. 7 there is a connector 150 that is adapted to be connected to a corresponding connector shown in the above-identified patent to T. A. Hansen and which is therein designated by the reference numeral 606. As described in the Hansen patent, transmission of a signal from each channel of the multiplex distributor is followed by the generation of a clock operating pulse (see line L in Figs. 8, 9 and 10) which is impressed on the lead 609 shown in this patent. This pulse is provided for application to a source of signals to change the signal stored in the signal source and apply a new signal to the storage facilities in anticipation of subsequent transmission from this channel.

In the present disclosure it is proposed to connect the lead 609 shown in the Hansen patent to a lead 151 in Fig. 7. A rise in potential due to the appearance of an operating pulse on lead 151 causes a rise in potential to appear on the base of a normally conducting transistor 152. Transistor 152 in conjunction with a transistor 153 and interconnecting circuits form another one shot multivibrator circuit, hence the appearance of an increased potential on the base of transistor 152 renders this transistor nonconducting and transistor 153 conducting. More specifically, nonconduction of the transistor 152 is followed by a drop in its collector potential which is applied through a coupling lead 154 to the base of the normally nonconducting transistor 153 thereby placing this transistor in a conducting state. Transistor 153 will maintain conduction for a period of time determined by the value of a capacitance 155 and the resistance values of the circuit coupling transistor 153 to the transistor 152. After a time delay determined by the RC value of this coupling circuit, the transistor 152 will again assume a conductive condition causing its collector potential to rise.

Coupling lead 154 is also connected to a lead 156 which runs to the base of a normally conducting emitter follower transistor 157. It may be appreciated that when the transistor 152 is rendered nonconductive its collector potential drops to apply a decreased potential over leads 154 and 156 to drive the transistor 157 into a greater state of conduction. When transistor 152 restores to its normally conducting condition then the potential appearing on leads 154 and 156 will rise to materially reduce the state of conduction of the transistor 157. The emitter potential of transistor 157 will decrease when the transistor is driven into a state of ready conduction and will rise when the transistor is driven towards a state of nonconduction. A wave form illustrating the potential on the emitter of transistor 157 is shown in Figs. 8, 9 and 10 and is therein designated by the reference letter M and the legend "transfer drive amplifier."

Looking at Fig. 8, wave form M, it will be noted that the change in emitter potential of transistor 157 occurs during the time that the start-stage, wave form 90, of the start-stop distributor assumes a conductive condition. When start-stage transistor 90 (Fig. 5) assumes a conductive condition, its collector potential rises and an increased potential is impressed over a lead 158 to the base of a normally conducting emitter follower type transistor 159, thereby driving the base of this transistor positive with respect to its emitter to reduce its state of conduction. As the emitter potential of transistor 159 rises due to the decreased state of conduction thereof an increased potential is impressed over a lead 161 to the base of a normally conducting transistor 162 which through interconnecting circuits forms with a normally nonconducting transistor 163 a bi-stable circuit similar to those described with relation to the bi-stable circuits for storing the intelligence signal impulses. Appearance of an increased potential on the base of transistor 162 is followed by the rendition of this transistor nonconducting whereupon its collector potential drops to impress a decreased potential over a coupling lead 164 to the base of the nonconducting transistor 163 and immediately thereupon transistor 163 assumes a conductive condition. Conduction of transistor 163 is followed by a rise in its collector potential which is impressed over a lead 166 to a diode 167. The transfer prime potential existing on lead 166 is shown in Figs. 8, 9 and 10 by the wave form designated J.

The rendering of transistor 162 nonconducting is followed by a drop in its collector potential which is impressed over lead 164 and lead 168 to a junction point 169, positioned to the right of the transistor 152. The appearance of a decreased potential at this junction point will cause the condenser 155 to discharge very rapidly, therefore driving the base of transistor negative hence restoring the transistor 152 to its normally conductive state. The restoring potential impressed over lead 168 is illustrated in Figs. 8, 9 and 10 by the wave form K.

Returning now to a consideration of the transistor 157 (Fig. 7) when driven into a heavy state of conduction by operation of the one shot multivibrator 152–153, it may be appreciated that with transistor 157 heavily conducting, the emitter potential thereof will drop and thus the potential on a junction point 171 will be maintained at a relatively low value. The change in potential existing on the emitter of the transistor 157 is designated in Figs. 8, 9 and 10 by the reference letter M. When the one shot multivibrator 152–153 is restored to its unoperated condition by the appearance of a drop in potential on the junction point 169, then the potential impressed over leads 154–156 will rise to drive the transistor 157 towards a state of nonconduction. Immediately thereupon the emitter potential of this transistor rises to impress an increased potential on junction point 171. It is to be recalled that when the bi-stable circuit 162–163 operated, the potential impressed on the diode 167 also increased. Under these conditions, the rise in potential at junction point 171 is impressed through a diode 172 (see wave form N in Figs. 8, 9 and 10) to the base of a normally conducting transistor 173. Transistor 173 in conjunction with a nonconducting transistor 174 and interconnecting circuits form a normally bi-stable circuit. More particularly, when the base of transistor 173 is driven positive the transistor 173 is rendered nonconducting and its collector potential will drop to impart a decreased potential through a junction point 176 to the base of the nonconducting transistor 174. Transistor 174 thereupon assumes a conductive condition and its collector potential rises to impart an increased potential over a lead 177 to the base of a normally conducting emitter follower transistor 178. Transistor 178 is therefore driven toward a state of nonconduction and its emitter potential rises to impart an increased potential over a bus lead 179. The potential condition existing on bus lead 179 is illustrated in Figs. 8, 9 and 10 by the wave form O.

Bus lead 179 is connected to a plurality of diodes respectively designated by the reference numerals 181, 182, 183, 184, 185 and 186. Looking at Figs. 8, 9 and 10 it will be noted that the increased potential impressed on lead 179 (see wave form O) will occur before the transistor stage 91 in the start-stop distributor is operated. As each of the transistors 91 to 95 is operated in the start-stop distributor, the first level bi-stable storage circuits are actuated in accordance with the incoming intelligence signal impulses. Recalling that the first intelligence impulse is a marking condition (see wave form A) then transistor 131 will be shut off and the transistor 138 operated. Operation of the transistor 138 is followed by a rise in collector potential which is impressed over a lead 187 to a diode 188. Diode 188 in conjunction with diode 181 act as an "and" gate to control the potential impressed on a junction point 189 located therebetween. Recalling that the potential applied at the diode 181 is at an increased value due to the decreased conduction of transistor 178, then it is apparent that the junction point 189 will also rise. The rise in potential at junction point 189 is impressed through a diode 199 to a base of a normally conducting transistor 192. Transistor 192 together with a number of other normally conducting transistors 193, 194, 195, 196 and normally nonconducting transistors 200, 201, 202, 203, and 204 form bi-stable storage circuits for again storing the intelligence signal impulses at a second level. It may be thus understood that as the first level bi-stable storage circuits are operated the corresponding second level bi-stable storage circuits are identically operated because the first bi-stable storage circuits are coupled by leads 206, 207, 208 and 209 to diodes 211, 212, 213, and 214 respectively, which are part of "and" gates identical to the previously described "and" gate consisting of diodes 181 and 188.

Whenever a rise in potential is impressed on lead 179, it is also impressed through the diode 186 to a junction point 216. An increase in potential on junction point 216 is impressed on a base of a normally conducting transistor 217 to cause said transistor to assume a nonconducting condition. Transistor 217 is coupled by suitable circuits to a transistor 218 to form another bi-stable circuit. Obviously, when transistor 217 is rendered nonconducting, its collector potential drops to impress a decreased potential on the base 218 therefore causing this transistor to assume a conducting condition.

The signal stored in the second level bi-stable circuit is illustrated by the wave forms P1–6 shown in Figs. 8, 9 and 10. In summary it may be stated that whenever a transfer pulse is received from the multiplex distributor to impress an increased potential on lead 179 and the start transistor 90 in the start-stop distributor has just assumed a nonconductive state then the subsequent intelligence impulses impressed on the first level bi-stable circuits will be immediately transferred to the second level bi-stable circuits. Also it may be noted that each time an increased potential is imparted to the lead 179 in response to the receipt of an operating pulse from the multiplex distributor the bi-stable circuits 217–218 will be operated.

The conditions assumed by the transistors 200–204 are indicative of the incoming intelligence signal impulses and these conditions are impressed over leads 220, 221, 222, 223 and 224 respectively to the connector 150 which functions to feed the intelligence signals into the multiplex transmitting distributor. In a like manner the now conductive condition of transistor 218 is represented by a rise in potential on a lead 226 which also runs to the connector 150 and controls the transmission of a marking impulse by the multiplex distributor following the transmission of each group of intelligence signal impulses. Transmission of this signal by the multiplex distributor is illustrated by line T in Figs. 8, 9 and 10 and it will be noted that this transmission occurs in the first cycle of operation at a time just after the last intelligence signal impulse has been stored in the bi-stable circuits 135–142 and 196–204.

When the transistor 96 in the stop stage of the start-stop distributor reoperates, the collector potential thereof rises to impress an increased potential over a lead 230 to a diode 231. Diode 231 is connected through a junction point 232 to a diode 233. The increased potential impressed on diode 231 also appears on the junction point 232 which raises the potential value of this junction point with respect to the junction point 176, and hence the potential appearing at the base of transistor 174 also rises to shut off the transistor 174.

When transistor 174 assumes a nonconductive condition, its collector potential drops to impress a decreased potential over a coupling lead 238 to the base of the nonconducting transistor 173. Appearance of a decreased potential on the base of transistor 173 drives this transistor into a state of conduction and the circuit is now restored to its initial condition as shown in Fig. 7. When transistor 173 reassumes its conductive condition, its collector potential rises to impress an increased potential over a lead 239 and a lead 241 to the base of the now conducting transistor 163 (Fig. 6). The appearance of increased potential on the base of transistor 163 shuts this transistor off and immediately thereupon its collector potential drops and this decrease in potential is impressed through its coupling circuits to the base of the conducting transistor 162. Obviously the transistor 162 assumes a conducting condition and the bi-stable circuit is restored to its initial condition.

In order to insure that the multiplex distributor transmits every signal applied to the code converter shown in Figs. 4, 5, 6 and 7, it is necessary that the transmitting distributor transmit the signals at a faster rate than which the incoming signals are being received and applied to the transmitting multiplex distributor. This condition is illustrated in Figs. 8, 9 and 10 wherein it may be noted that the start transistor 90 is actuated at a lower frequency rate than the clock pulses are impressed over the lead 151 (see wave form L). It may be appreciated that if no correction were made, then two incoming clock pulses would be received within the period of successive operations of the start transistor 90 and as a result thereof there would be a transmission of the same signal twice. The veracity of this statement manifests itself as the previous signals were not cleared from the first and second storage levels then the clock pulse would effectuate, first, the removal of the signal stored in the second level and, second, the clock pulse would cause the generation of a transfer pulse to transfer the signal stored in the first level which is the same as the signal just transmitted. In order to avoid this contingency the present invention contemplates that when the clock pulse is received a second time before the start transistor 90 has a chance to operate a second time, then there will be no transfer of an intelligence signal to the multiplex transmitting distributor, but rather a blank signal will be inserted and transmitted.

This mode of operation is illustrated in Figs. 8, 9 and 10 by that section of the wave form designated as the second cycle of operation. Assume for purposes of illustration that the signal previously stored in the second level bi-stable circuits has just been transmitted and that a second clock pulse has been impressed on the lead 151. Inasmuch as the transistor 90 has not yet operated, then the transistor 162 is in its normally conductive state and its collector potential is at its high value. The high value of collector potential is impressed over leads 164 and 168 to the junction point 169.

When the clock or operating pulse is received over the lead 151, the one shot multivibrator 152–153 will execute a relatively slow timed operation due to the high potential now appearing at junction point 169 which precludes rapid discharge of the capacitance 155. The appearance of a clock pulse over lead 151 also causes a rise in potential on a lead 242 which drives a base of a normally conducting emitter follower transistor 243 positive with respect to its emitter. Conduction of transistor 243 thereupon decreases and its emitter potential rises. This rise in emitter potential is impressed over a bus lead 244 (see wave form S in Figs. 8, 9 and 10) which is connected to the bases of the transistors 200, 201, 202, 203, 204 and 218, thereby rendering nonconductive those transistors which have been operated in the second level bi-stable storage circuits in accordance with the intelligence signal stored therein.

When the one shot multivibrator 152–153 restores after its slow period of operation to its normal condition, a rise is impressed over leads 154 and 156 to reduce the conductive condition of the transistor 157. The emitter potential of transistor 157 thereby rises and this rise in potential will be passed through a coupling condenser 246 and therein differentiated to produce a positive going pulse on junction point 171. However, it is to be recalled that the start transistor 90 has not operated and thus the bi-stable circuit 162–163 has not operated thus the low collector potential on the transistor 163 is impressed over lead 166 to the diode 167. The appearance of a positive going pulse at junction point 171 is thereupon passed through the diode 167 rather than through the diode 172. The potential impressed on transistor 173 does not change and as a result the transistor 173, 174 and 178 maintain their normal condition. With transistor 178 in its full conductive condition, the potential impressed over lead 179 is at a relatively low value, consequently, the potential impressed on the diodes 181 to 186, inclusive, is very low and thus any signal stored in the first level bi-stable circuit is not transferred to the second level bi-stable circuit.

It is to be again reiterated that the operating pulse has been received and the one shot multivibrator 152–153 has executed a cycle of operation prior to the operation of the start transistor 90. When, during the receipt of the next signal, the start transistor 90 is operated, the transistor 159 is driven towards nonconduction, causing its emitter potential to rise to effect an operation of the bi-stable circuit 162–163. Moreover, when the emitter follower 159 is driven toward a state of nonconduction the rise in emitter potential is impressed over a lead 250 and a bus lead 251 (see wave form I in Figs. 8, 9 and 10) to the bases of the transistors 138 to 142, inclusive, thus rendering non-operative any of these transistors that have been previously operated in accordance with the previously received signals and hence the signal stored in the first level storage circuits is removed without effectuating a second control of the second level storage circuits.

The next succeeding signal, which as illustrated in Figs. 8 and 9 is an all marking signal, is then received and all of the first level bi-stable storage circuits are operated but the operation of these bi-stable circuits is not immediately transferred to the second level bi-stable storage circuits due to the low potential existing on the diodes 181 to 186, inclusive. Now when the transmitting multiplex distributor transmits the signal stored in the transistors 200 to 204 and 218, the signal transmitted will consist of a series of six spacing impulses which will be indicative of an inserted blank.

An inserted blank may be differentiated from a signal representative of a "blank" function by the fact that when a signal representative of a "blank" function is transferred from the first level bi-stable storage circuit to the second level bi-stable storage circuit there will be a transfer pulse applied over bus lead 179 to render the transistor 217 nonconducting and the transistor 218 conducting. It will be noted that the output of the transistor 218, which in this instance is an increased potential applied on lead 226, is applied to the connector 150 for transmission by the multiplex transmitting distributor. Recapitulating briefly, it is believed obvious that an inserted blank does not have a control marking pulse accompanying its transmission and that a signal indicative of a "blank" function is accompanied by a marking control impulse supplied over the lead 226.

Considering now the next or third cycle of operation of the multiplex distributor, the clock or operating pulse is applied to the lead 151 while the transfer bi-stable circuit 162–163 is still operated as a result of the transistor 90 operating in the preceding cycle. Under these conditions the nonconduction of transistor 162 causes a large negative potential to be applied over the leads 164 and 168 to the junction point 169, consequently, when the operating pulse is applied to the one shot multivibrator 152–153, the one shot multivibrator will execute a rather rapid cycle of operation due to the rapid discharge of the capacitor 155. During the time that transistor 152 is shut off, a decreased potential will be applied over the leads 154 and 156 to decrease the conduction of the emitter follower transistor 157.

Inasmuch as the bi-stable circuit 162–163 is operated, a relatively high potential is applied at diode 167. Also, the rise in emitter potential of transistor 157 is differentiated by the coupling condenser 246 to produce a positive going pulse at junction point 171. This positive pulse passes through the diode 172 to shut off the transistor 173. Nonconduction of transistor 173 is followed by a decrease in its collector potential which is impressed over the coupling lead 239 to render the transistor 174 conducting. Conduction of transistor 174 is accompanied by a rise in its collector potential which is impressed over the lead 177 to the base of the transistor 178. Transistor 178 is thus driven toward a state of nonconduction and its emitter potential will rise to impress an increased potential over the bus lead 179 (see wave form O). As previously discussed, an increase in potential on the lead 179 conditions the diodes 181 to 185 with an increased potential thereby permitting the signal stored in the transistors 131 to 135 and 138 to 142 to be transferred to the second level bi-stable circuits 192 to 196 and 200 to 204. All of these second level bi-stable circuits will be operated inasmuch as all of the bi-stable circuits in the first level storage circuits were operated. Obviously the bi-stable circuit 217–218 will also be operated. The condition of the second level bi-stable storage circuit is illustrated in Fig. 9 by the wave forms P1 to 6 above the third cycle designation.

It will be noted that the transfer occurs from the first level storage circuit to the second level storage circuit during the period that the stop transistor 96 is in a conducting state (see wave form 96, Fig. 9). It will be recalled that when transistor 96 is conducting an increased potential will be applied over the lead 230 to the diodes 231 thus applying an increased conditioning potential to the base of transistor 174. With the increased conditioning potential on the base of transistor 174, the circuit parameters of the bi-stable circuit 173–174 are thereby altered so that the circuit changes from a bi-stable circuit to a one shot multivibrator. The net result of this operation is that a very short transfer pulse is produced when the transistor 173 is shut off in response to an operating or clock pulse which is illustrated by wave form O. The width of the transfer pulse is determined by the value of the capacitance 237. Now when the next succeeding signal is received, a start impulse will shut transistor 96 off and turn transistor 90 on. Thereafter the incoming signal will be stored in the first level bi-stable circuits, and, since the transfer potential is removed from lead 179 at this time there will be no transfer to the second level bi-stable storage circuits. During the latter part of the time in which this signal is being stored in the first level bi-stable storage circuit, the multiplex distributor will now transmit the all marking signal stored in the second level bi-stable storage circuits.

Transmission will thus continue in the subsequent cycles and during each subsequent cycle the incoming operating or clock pulse will advance in time towards the time that a start pulse is received from the outlying start-stop generator. The wave forms shown above the designation "fourth cycle of operation" in Fig. 10 are typical of the type of transfer that occurs during a majority of the time. More particularly, it will be noted that the operating or clock pulse (wave form L) will be impressed on the lead 151 during the arrival of one of the intelligence impulses from the signal generator.

Considering the fourth cycle it will be noted that the first intelligence impulse which is a marking impulse will actuate the bi-stable circuit 131–138 and that the second intelligence which is a spacing impulse will not actuate the bi-stable circuits 132–139. During the receipt of the third intelligence impulse which is a spacing impulse, the operating pulse will be impressed on the lead 151 to operate the one shot multivibrator 152–153 to in turn control the operation of the bi-stable circuits 173–174. Again when transistor 174 assumes a conductive condition, its increased collector potential is impressed over lead 177 to reduce the conductivity of transistor 178. Decrease in the conduction of transistor 178 causes its emitter potential to rise to again apply a transfer pulse over the lead 179. Application of the transfer pulse to lead 179 immediately effects the transfer of the marking impulse stored in bi-stable circuits 131–138. Since bi-stable circuits 132–139 and 133–140 have not been operated, there will be no change in the condition of the associated bi-stable storage circuits in the second level. When the fourth intelligence impulse which is a marking condition is received, the bi-stable circuit 134–141 is immediately operated and because an operating transfer potential is already present on bus lead 179 an immediate transfer of this marking pulse is effected to the second level bi-stable storage circuits 195–203. The fifth intelligence impulse is a spacing impulse and as a result the bi-stable storage circuit 135–142 is not operated and manifestly the second level bi-stable storage circuit 196–204 is not operated.

When the time arrives for the transmitting multiplex to transmit the signal associated with this channel, a complete signal will have already been stored in the second level bi-stable storage circuits to effect the desired transmission of this signal. As transmission progresses it will be noted that the positive going potential of the emitter of the transistor 157 (see wave form M) approaches the time that the bi-stable circuit 162–163 is initiated into operation (see wave forms J and K). When the positive going portion of wave form M passes the time at which the bi-stable circuit 162–163 is operated (see wave forms J and K) then there will be no operation of the transistors 173–174 and as a result thereof it will be no transfer from the first level storage circuits to the second level storage circuits. Instead, the multiplex transmitting distributor will transmit an inserted blank because the second level bi-stable circuits will have been cleared of any signals by the receipt of a prior operating pulse over leads 151 and 242 to drive the transistor 243 towards a nonconductive state thereby raising the potential on lead 244 to clear the second level storage circuit of any signal. Following transmission of the inserted blank the receipt of start impulse associated with the next incoming signal causes the transistor 90 in the distributor to function whereupon transistor 159 is reduced in its state of conduction thereby causing an increased potential to be impressed over lead 250 to clear the signal stored in the first level storage circuits. Thereafter the received intelligence impulses of the signal will be stored in the first level storage circuits and subsequently transferred simultaneously to the second level storage circuits for transmission. Subsequently, the number five incoming intelligence impulse will be immediately transferred and during subsequent cycles of operation more and more of the incoming intelligence impulses will be immediately transferred to the second level storage circuits as they are received.

Referring to Fig. 7 there are shown a number of dashed conductors 300 to 305, inclusive, which represent leads that may be connected to the collectors of transistors 192 to 196 and 217 for purposes of obtaining an inverted signal output. In this instance the leads or portion of the leads 300 to 305 would be connected to connector plug 150. It is often desirable to invert a portion of the signals generated during periods when no intelligence is being transmitted, because such signals will have a transition in energy level which may be utilized by the receiving equipment to maintain synchronism between the receiving equipment and the transmitting equipment.

It is to be understood that the above-described arrangement of circuit components, selection of components and construction of elemental parts are simply illustrative of an application of the principles of the invention and many other modifications may be made without departing from the invention.

What is claimed is:

1. In a code converter, means for receiving signals having a predetemined number of intelligence impulses interposed between start and stop impulses, a first level storage means, means initiated into operation by the receiving means in response to the receipt of a start impulse for operating the storage means in accordance with the intelligence impulses, a second level storage means, dual diode gating circuits having one diode connecting each of the first level storage means to one of the second level storage means, a bi-stable transfer circuit connected to all the second diodes of said dual diode gating circuits, means for periodically operating said transfer circuit, and means responsive to the receipt of a stop impulse for changing said bi-stable circuit into a one shot multivibrator to terminate the operation of the transfer circuit.

2. In a code converter as defined in claim 1, means responsive to a start impulse for restoring the first level storage means to an initial unoperated condition.

3. In a code converter, a start-stop multi-stage distributor means having a transistor in each stage, means for receiving signals comprising a predetermined number of intelligence impulses interposed between start and stop impulse, means actuated by the receiving means receiving a start impulse for initiating the distributor means through a single cycle of operations, means under the conjoint control of the transistors in the distributor means and the receiving means for storing each intelligence impulse, a second storage means, cyclically operable means for generating an operating pulse, a first bi-stable circuit actuated by the transistor in the first distributor stage, a second bi-stable circuit means actuated by the operation of the first bi-stable circuit and an operating pulse for transferring the signal from the first to the second storage means, means actuated by the operation of the transistor in the last stage of the distributor means for restoring said second bi-stable circuit means to its initial condition, and means actuated by the restoration of the second bi-stable circuit means for restoring the first bi-stable circuit means to its initial condition.

4. In a code converter, means for receiving signals of a first predetermined frequency, said signals having a predetermined number of intelligence impulses interposed between start and stop impulses, a first group of bi-stable storage circuits equal in number to the number of intelligence impulses in a signal and adapted to be set in accordance with the character of the intelligence impulses, means actuated by the receiving means for setting the first bi-stable circuits in accordance with the character of the intelligence impulses, a second group of bi-stable storage circuits, gating circuits interconnecting each first bi-stable circuit with one of said second bi-stable circuits and conditioned for operation in accordance with the setting of the first bi-stable circuits, a bi-stable transfer circuit adapted to operate said conditioned gating circuits, means for generating operating pulses at a frequency greater than the frequency at which signals are being received, means controlled by said operating pulses for operating the transfer circuit, and means for suppressing the operation of said transfer circuit whenever two operating pulses are applied to said control means within the period of receipt of two start impulses.

5. In a code converter, means for receiving signals at a first predetermined frequency, a multistage start-stop distributor means, means operated by the receiving means for driving the distributor means through a cycle of operations, first level storage means, means under the control of both the receiving means and the distributor means for operating the first level storage means in accordance with the character of the signal, second level storage means, means for transferring the signal from the first level to the second level storage means, a gating circuit having two control elements for operating said transfer means, a one shot multivibrator for actuating the first of said control elements, means for operating said one shot multivibrator at a second predetermined frequency which is faster than the frequency at which the signals are being received, and a bi-stable circuit operated by the operation of the first stage of the distributor means for conditioning said second control means whereby the actuation of the first control means operates the transfer means.

6. In a code converter as defined in claim 5, means controlled by the last stage of the distributor means for restoring the transfer means to the unoperated condition.

7. In a code converter as defined in claim 6, means for restoring the bi-stable circuit to the initial condition before the reception of each signal.

8. In a code converter, means for receiving signals comprising a predetermined number of impulses interposed between start and stop impulses, a closed ring type multistage distributor having a number of stages equal to the number of impulsses in a signal, first level storage means individually associated with individual stages of the distributor, means actuated by the receiving means in response to the receipt of start impulses and under the control of the distributor for driving the distributor through a cycle of operation, means under the conjoint control of the distributor and the receiving means for operating the storage means in accordance with the intelligence impulses, second level storage means, gating circuits interconnecting the first and second storage means, transfer means adapted to actuate the gating circuits, a transfer gating circuit comprising a control transistor and a diode for operating the transfer means, a bi-stabe circuit operated by the distributor for conditioning said diode, means for periodically generating an operating pulse, and a one shot multivibrator operated by said operating pulse for controlling the transistor whereby said transfer gating circuit is operated to operate said transfer means.

9. In a code converter, means for receiving signals consisting of a predetermined number of intelligence impulses interposed between start and stop impulses, a distributor having a number of stages equal to the number of impulses in a signal, means for rendering one of the stages normally operative, an oscillator adapted to drive the distributor, means controlled by the normally operative stage of the distributor for holding the oscillator from operation, means actuated by the receiving means in response to the receipt therein of a start impulse for rendering the holding means ineffective, first settable bi-stable storage circuits, means actuated by the receiving means in conjunction with the operation of the distributor for setting the bi-stable storage circuits in accordance with the intelligence impulses, second settable bi-stable circuits, transfer means adapted to transfer the setting of the first storage circuits to the second storage circuits, transistor means actuated by said normally-operative distributor stage for restoring the initial setting of the first storage circuits, a bi-stable control circuit operated by the transistor means for conditioning the transfer means for operation, means for periodically operating the conditioned transfer means, means actuated by the operation of the last distributor stage for terminating the operation of the transfer means, and means actuated by the termination of operation of the transfer means for restoring the bi-stable control circuit to its initial condition.

10. In a code converter, a start-stop multistage distributor means, a first group of storage circuits, a second group of storage circuits, dual diode "and" gating circuits having one diode in each circuit inter-connecting the first and second storage circuits, a normally conductive emitter follower transistor for applying a potential to the second diode of each gating circuit to hold said gating circuits from operation, means responsive to start-stop signals, means actuated by the signal responsive means receiving a start impulse for driving the distributor through a cycle of operations, means for generating selection pulses in accordance with each signal impulse, means actuated successively by each operation of a stage in the distributor in conjunction with the generated selection pulses for accordingly operating the first storage circuits, means for generating periodic operating pulses, bi-stable means actuated by the first distributor stage, and means operated by the operating pulse and the operation of said bi-stable means for reducing the conduction of said emitter-follower transistor to remove the holding potential from the second diodes in said circuits.

11. In a code converter, means for receiving signals comprising intelligence impulses interposed between start and stop impulses, first storage circuits, a group of dual diode gating circuits for controlling the operation of the first storage circuits, a multistage distributor, each stage of said distributor controlling one diode of a corresponding one of the gating circuits, means responsive to a start impulse for operating the distributor through a cycle of operations, means for applying the intelligence impulses to the other diodes of said diode gating circuits whereby the first storage circuits are operated in accordance with the intelligence impulses, second storage circuits, a second group of dual diode gating circuits for controlling the operation of the second storage circuits, means connecting each first storage circuit to one of said diodes in said second group, a bi-stable circuit adapted to operate conditioned second dual diode gating circuits when said first diodes are conditioned by said first storage circuits, means for periodically generating operating pulses, a bi-stable circuit operated by the first stage of said distributor, and a gating circuit operated by the conjoint operation of said bi-stable circuit and said operating pulse for operating said transfer circuit.

12. In a converter for removing the start and stop impulses from a start-stop signal having a predetermined number of intelligence impulses, first storage circuits for storing each intelligence impulse, second circuits for storing each intelligence impulse, a start-stop multistage distributor for controlling the operation of the first storage circuits in accordance with the intelligence impulses in each signal, means actuated by a start impulse for initiating the distributor into a cycle of operations, a first bi-stable circuit actuated by the operation of the first stage of the distributor, a transfer circuit adapted to transfer the intelligence impulses from the first storage circuits to the second storage circuits, means for periodically generating an operating pulse, a one shot multivibrator actuated by said operating pulse, a gating circuit operated by the restoration of said multivibrator to the initial condition and the operation of said bi-stable circuit for operating said transfer circuit, and means controlled by the operation of the first bi-stable circuit for shortening the time of operation of said one shot multivibrator.

13. In combination, a multiplex transmitter, signal receiving means, a quiescent multistage distributor comprising a plurality of transistors interconnected together, means for maintaining one of the transistors normally energized, a start-stop oscillator for shutting off an energized transistor and rendering the next succeeding transistor conductive, an "or" gating circuit for holding the oscillator from operation, first means controlled by said receiving means for applying a first potential to hold said gating circuit, a second means controlled by said initially conductive transistor for applying a second potential to hold said gating circuit, means actuated by the receiving means for changing said first potential to operate said gating circuit to release the oscillator to drive the distributor, a plurality of storage means, means actuated by the receiving means to generate pulses in accordance with the character of each signal impulse, gating circuits under the conjoint control of the transistors in the distributor and said pulse generating means for actuating the storage means in accordance with the character of each signal impulse, a second level storage means, and transfer means under the conjoint control of the first transistor operated during a cycle of operation of the distributor and the multiplex transmitter for transferring the stored signal from the first to the second storage means.

14. In combination in a signal converting apparatus, a tone oscillator, means responsive to start-stop signals for controlling the tone oscillator output, a multistage distributor having a transistor in each stage, a start-stop oscillator for driving the distributor, a bi-stable circuit operated by said tone oscillator, means actuated by said bi-stable circuit being operated by a start impulse for initially operating the start-stop oscillator means controlled by the distributor for maintaining operation of said oscillator for a complete cycle of operation of said distributor, means controlled by said bi-stable circuit for generating pulses in accordance with each character of each signal impulse, gating circuits individually associated with the transistors in the distributor stages, means for applying said generated pulses to said gating circuits in synchronism with the operation of the transistors in the distributor, and bi-stable transistor storage means associated with each gating circuit and adapted to be operated whenever a transistor is operated and a generated pulse is simultaneously applied thereto.

15. In combination in a signal converting apparatus, a tone oscillator, means responsive to start-stop signals for controlling the oscillator whereby start and spacing signal impulses cause said oscillator to cease operation and stop and marking signal impulses cause said oscillator to operate, a multistage distributor having a transistor included in each stage, a start-stop oscillator for driving the distributor through a cycle of operation, a gating circuit for holding said start-stop oscillator from generation, a bi-stable control circuit actuated into a first setting by the operation of the tone oscillator and into a second setting by the cessation of operation of said tone oscillator, means controlled by the first operation of said bi-stable circuit into the second setting for releasing the gating circuit to permit the oscillator to drive the distributor, means controlled by the distributor for maintaining said gating circuit in a released condition during a single cycle of operation of said distributor, a group of bi-stable storage circuits, means controlled by the oscillator and the bi-stable control circuit in the first setting for generating pulses, and dual diode gating circuits interconnecting the pulse generating means and the stages of the distributor for controlling the operation of the bi-stable storage circuits.

16. In an apparatus for removing the start and stop impulses from a signal comprising a predetermined number of intelligence impulses interposed between start and stop impulses, means for receiving said signals at a first predetermined frequency, a first storage means, distributor means initiated into operation by a start impulse for actuating said storage means in accordance with the intelligence impulses, a second storage means, a transmitting means controlled by said second storage means, means actuated by the transmitting means for generating operating pulses at faster rate than signals are being received, a bi-stable transfer circuit operated by said operating pulse in conjunction with the distributor means for transferring the signal stored in the first storage means to the second storage means, means controlled by the distributor means for changing the bi-stable circuit into a one shot multivibrator to restore said transfer means to the initial condition, and means controlled by the distributor for precluding the operation of the transfer circuit whenever two operating pulses are generated within the period of receipt of two start impulses.

17. In combination, a multiplex transmitter having facilities therein for generating an operating pulse following transmission from each channel, code converters for supplying signals to each channel of the multiplex transmitter wherein each code converter includes means for receiving signals having start-stop impulses, a multistage transistor distributor, means actuated by the receiving means in response to the start impulses for driving the distributor through a cycle of operations, means controlled by the receiving means in conjunction with the operation of the transistors in the distributor for storing the intelligence portion of each signal, second level storage means for applying stored signals to the associated channel in the multiplex transmitter, first diodes of dual diode gating circuits interconnecting each of said first storage means with an associated second level storage means, a first bi-stable circuit controlling said second diodes of said diode gating circuits to effectuate a transfer of the signal stored in the first level storage means, a second bi-stable circuit actuated by the transistor is the first stage of the distributor, a gating circuit conditioned by said second bi-stable circuit and adapted to operate said first bi-stable circuit, and means responsive to an operating pulse for actuating said conditioned gating circuit.

18. In a code converter, means for receiving start-stop signals having a predetermined number of intelligence impulses, a start-stop multistage distributor, means actuated by the receiving means receiving a start impulse for driving the distributor through a single cycle of operations, a first level storage means under the conjoint control of the distributor means and the receiving means for storing each intelligence impulse, a second level storage means, a one shot multivibrator, means for cylically operating said multivibrator, means operated by the one shot multivibrator for transferring the signal stored in the first level storage means to the second level storage means, and means controlled by the distributor for varying the period of operation of the one shot multivibrator.

References Cited in the file of this patent

UNITED STATES PATENTS

| | | |
|---|---|---|
| 2,536,578 | Slayton (I) | Jan. 2, 1951 |
| 2,687,451 | Slayton (II) | Aug. 24, 1954 |
| 2,744,955 | Canfora | May 8, 1956 |